65,002

UNITED STATES PATENT OFFICE.

BERNARD OWENS, OF ST. LOUIS, MISSOURI.

IMPROVED COMPOSITION FOR INK.

Specification forming part of Letters Patent No. 65,002, dated May 21, 1867.

*To all whom it may concern:*

Be it known that I, BERNARD OWENS, of St. Louis, in the county of St. Louis, State of Missouri, have invented a new and useful composition for the purpose of ruling paper, entitled "Owens' Ultramarine Ruling-Ink;" and I do hereby declare that the following is a full, exact, and complete description of the same.

This composition, and for which I claim Letters Patent, consists of hot water, soluble blue de paris, alcohol, and ox-gall, in the following proportions, or similar: In one pint of hot water, more or less, dissolve one tea-spoonful of soluble blue de paris, or any other proportion to make the required color of ruling-ink. After this composition is cold, add one ounce of proof alcohol and one tea-spoonful of ox-gall, or in other proportions, to suit the paper on which it is to be used; or the alcohol may be omitted, all in all, according to the paper on which the ink is to be used. In general, I compound this ink in such proportions as will give the proper color and suit given paper, as above named and described.

What I claim as my invention is—

The composition, or like composition, as above named and described, and for the purposes set forth, or any other substantially the same, for the purposes set forth, and to produce the above-named effect.

BERNARD OWENS.

Witnesses:
CHAS. H. DOLBEER,
LUTHER BABCOCK.